(12) United States Patent
Mormino et al.

(10) Patent No.: US 11,426,686 B1
(45) Date of Patent: Aug. 30, 2022

(54) FLUID FILTER WITH UNDER-CAP METERED FLUID SHUT OFF ASSEMBLY

(71) Applicant: ENPRESS LLC, Eastlake, OH (US)

(72) Inventors: Michael P. Mormino, Aurora, OH (US); Douglas M. Horner, Gates Mills, OH (US); James R. Cooney, Bratenahl, OH (US)

(73) Assignee: ENPRESS LLC, Eastlake, OH (US)

( * ) Notice: Subject to any disclaimer, the term of this patent is extended or adjusted under 35 U.S.C. 154(b) by 0 days.

(21) Appl. No.: 17/223,150

(22) Filed: Apr. 6, 2021

Related U.S. Application Data (60) Provisional application No. 63/006,171, filed on Apr. 7, 2020.

(51) Int. Cl.
*B01D 29/33* (2006.01)
*B01D 35/157* (2006.01)

(52) U.S. Cl.
CPC ......... *B01D 35/1573* (2013.01); *B01D 29/33* (2013.01); *B01D 2201/291* (2013.01); *B01D 2201/4092* (2013.01)

(58) Field of Classification Search
CPC .............. B01D 35/1573; B01D 29/33; B01D 2201/291; B01D 2201/4092
See application file for complete search history.

(56) References Cited

U.S. PATENT DOCUMENTS 5,065,901 A * 11/1991 Brane ................ G01F 1/06
222/14

* cited by examiner

*Primary Examiner* — Waqaas Ali
(74) *Attorney, Agent, or Firm* — Rankin, Hill & Clark LLP (57) ABSTRACT

A cap for a filter system includes a housing, a turbine, at least one gear, and a valve. The housing defines an interior of the cap configured for receiving a fluid flow. The turbine is supported on the housing in the interior of the cap and configured for being driven by the fluid flow. The at least one gear is supported on the housing and meshed with the turbine for being driven by the turbine. The valve is supported on the housing and meshed with the at least one gear for being driven by the at least one gear. The valve closes the interior of the cap from receiving the fluid flow after a predetermined number of rotations driven by the at least one gear.

20 Claims, 8 Drawing Sheets

FLUID FILTER WITH UNDER-CAP METERED FLUID SHUT OFF ASSEMBLY

PRIORITY CLAIM

This application claims priority to U.S. Provisional App. Ser. No. 63/006,171, filed Apr. 7, 2020, which is hereby incorporated by reference in its entirety.

BACKGROUND OF INVENTION

Fluid filters lose filtration capacity after a predeterminable period of use and should be replaced when the predetermined period of use has ended. However, it is sometimes difficult to ascertain whether a fluid filter has reached the end of the predetermined period of use.

BRIEF SUMMARY OF THE INVENTION

The present invention provides a fluid filter with an under-cap metered fluid shut-off assembly that shuts off the fluid flow when the filter reaches its predetermined filtration capacity. In an embodiment, the fluid filter can be a carbon filter for filtering a predetermined amount of water. Several embodiments of under-cap metered fluid shut-off assemblies are described herein. Each utilizes a turbine that is rotated by fluid passing through the cap to mechanically turn a set of gears in a gear stack. The last gear in the gear stack enmeshes with a shut-off gear, which is threaded onto a shaft and is biased by a spring. When the shut-off gear has been rotated a predetermined full revolutions and/or partial revolutions, which can be determined using a washer, the shut-off gear threads off the threaded shaft and is biased by the spring to seat in the cap and shut-off the flow of fluid through the filter. The gear ratio and number of revolutions required to unseat the shut-off gear can be set such that the shut-off valve actuates when a predetermined volume of fluid has flowed through the filter, thereby ensuring that the filter is replaced when it has reached its end life and no longer has the desired filtration capacity.

According to one aspect, a cap for a filter system includes a housing, a turbine, at least one gear, and a valve. The housing defines an interior of the cap configured for receiving a fluid flow. The turbine is supported on the housing in the interior of the cap and configured for being driven by the fluid flow. The at least one gear is supported on the housing and meshed with the turbine for being driven by the turbine. The valve is supported on the housing and meshed with the at least one gear for being driven by the at least one gear. The valve closes the interior of the cap from receiving the fluid flow after a predetermined number of rotations driven by the at least one gear.

According to another aspect, a cap for a filter system includes a housing, a shaft, a valve, a turbine, and a gear stack. The housing defines an interior of the cap and an opening configured for receiving a fluid flow into the interior of the cap. The shaft has a proximal end portion mounted on the housing, and a distal end portion extended from the proximal end portion in a longitudinal direction of the shaft. The valve is supported in the interior of the cap on the distal end portion of the shaft, the proximal end portion of the shaft being located on the housing such that the distal end portion of the shaft and the valve are aligned with the opening in the longitudinal direction of the shaft. The turbine is supported on the housing in the interior of the cap and configured for being driven by the fluid flow. The gear stack is supported on the housing, and meshed with the turbine and the valve such that when the fluid flow drives the turbine, the turbine drives the valve through the gear stack to rotate around the shaft, where the valve closes the interior of the cap from receiving the fluid flow after a predetermined number of rotations around the shaft driven by the gear stack.

The foregoing and other features of the invention are hereinafter more fully described below, the following description setting forth in detail certain illustrative embodiments of the invention, these being indicative, however, of but a few of the various ways in which the principles of the present invention may be employed.

BRIEF DESCRIPTION OF THE DRAWINGS

With reference to the accompanying drawing figures, please note that.

DETAILED DESCRIPTION OF THE INVENTION

Figure 1:
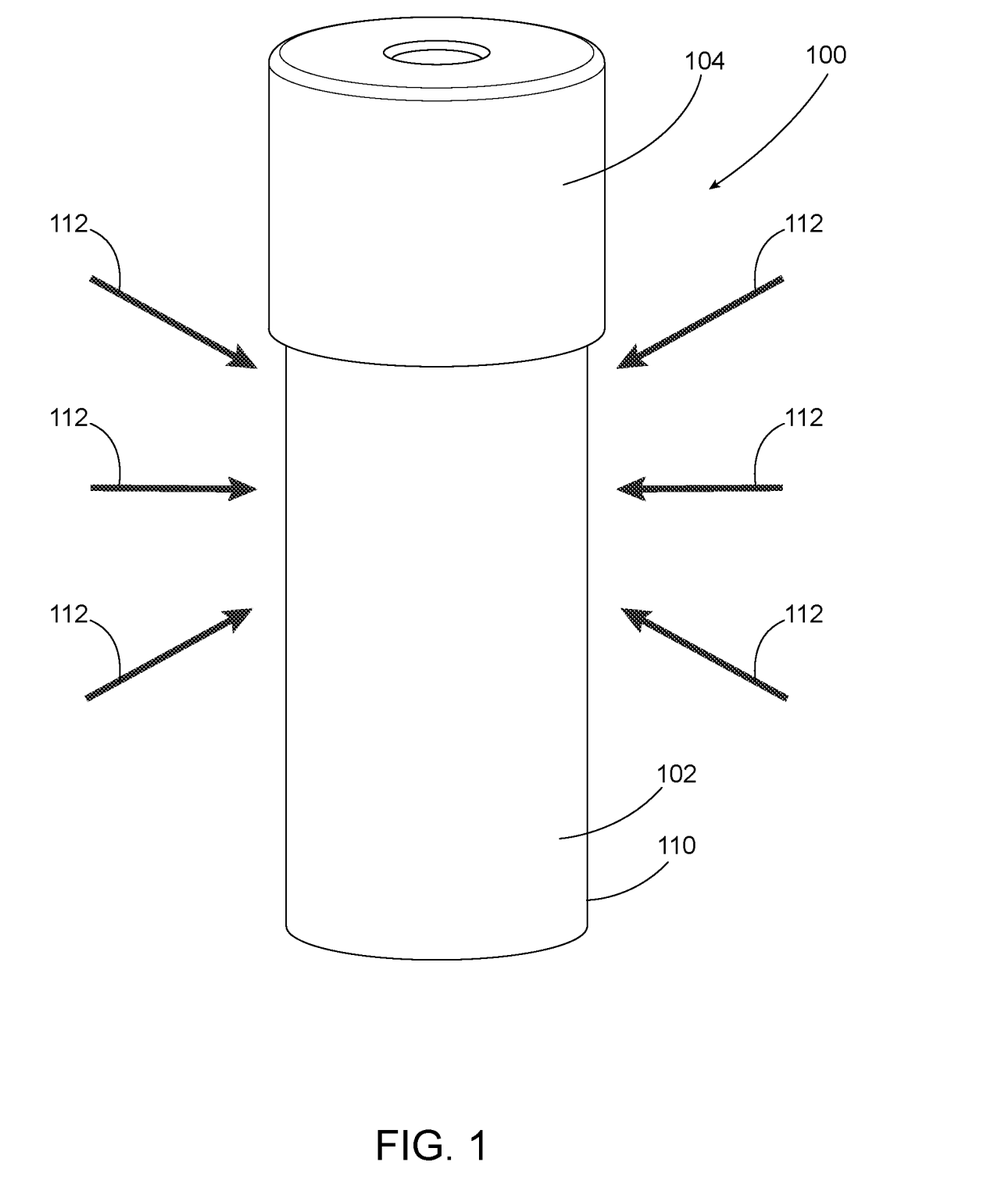
FIG. 1 is a front perspective view of a filter system including a filter body and a cap.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically depicts a front perspective view of a filter system 100 including filter body 102 fixed directly to a cap 104. An exterior surface 110 of the filter body 102 defines an exterior of the filter body 102 and is configured for receiving a fluid flow 112 such that fluid external to the filter body 102 enters the filter body 102 from the exterior of the filter body 102.

Figure 2:
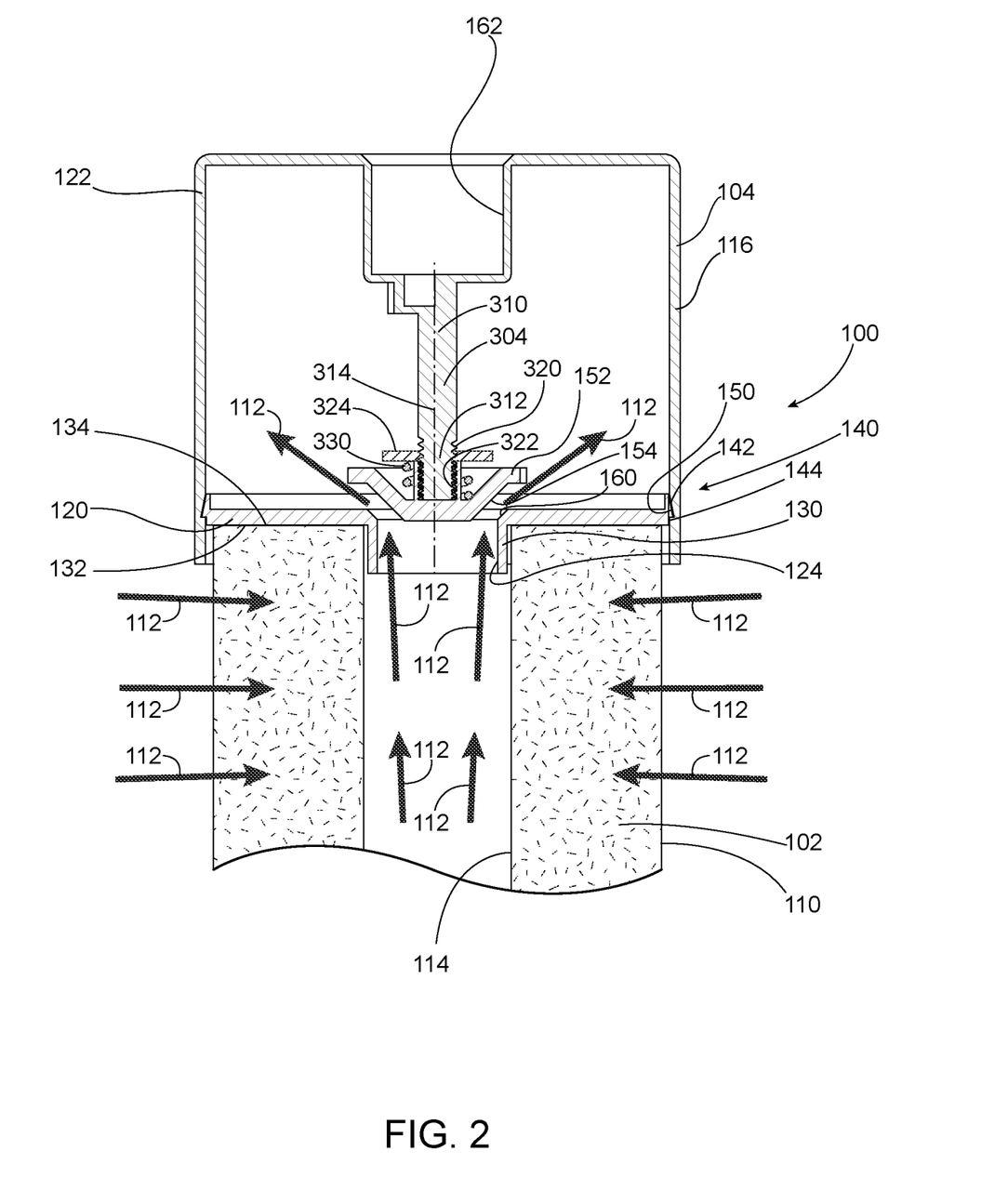
FIG. 2 is a partial, cross-sectional side view of the filter system.

FIG. 2 depicts a partial, cross-sectional side view of the filter system 100, including the filter body 102 and the cap 104. As shown in FIG. 2, the filter body 102 includes an interior surface 114 which defines an interior of the filter body 102 as a central cavity thereof, and the cap 104 includes a housing 116 formed from a lower cap portion 120 and an upper cap portion 122 which define an interior of the cap 104 enclosed between the lower cap portion 120 and the upper cap portion 122, where the interior of the filter body 102 and the interior of the cap 104 are in direct fluid communication through an opening 124 defined in the lower cap portion 120 as an inlet for the fluid flow 112 to the interior of the cap 104 from the interior of the filter body 102. As such, the fluid flow 112 passes through the filter body 102 from the exterior to the interior of the filter body 102, and travels into the interior of the cap 104 through the opening 124 in the lower cap portion 120. In the depicted embodiment, the filter body 102 is a carbon filter, and fluid included the fluid flow 112 is water, however the filter body 102 may feature additional and/or alternative filter types and the fluid flow 112 may feature additional and/or alternative fluids without departing from the scope of the present disclosure.

The cap 104 includes a flange 130 disposed around the opening 124 and extended from the lower cap portion 120, along the interior surface 114 of the filter body 102, and into the interior of the filter body 102. The flange 130 is configured to locate the opening 124 in the cap 104 with the interior of the filter body 102 and bring the interior of the cap 104 into fluid communication with the interior of the filter body 102. In this manner, the flange 130 is configured to direct the fluid flow 112 from the filter body 102 to the cap 104. The cap 104 is fixed to the filter body 102 through adhesive disposed between and against a lower surface 132 of the lower cap portion 120 and an upper surface 134 of the filter body 102, however, the cap 104 may be additionally and/or alternatively fixed to the filter body 102 through a press-fit connection, welding, and fasteners without departing from the scope of the present disclosure.

The lower cap portion 120 is fixed with the upper cap portion 122 through a catch mechanism 140 formed between an inclined surface 142 extended radially outward from an exterior surface 144 of the lower cap portion 120, and a recess 150 defined in the upper cap portion 122, the recess 150 being a detent configured to catch and retain the inclined surface 142 of the lower cap portion 120. In this manner, the lower cap portion 120 is permanently fixed with the upper cap portion 122 such that the lower cap portion 120 cannot be separated from the upper cap portion 122 without damaging at least one of the lower cap portion 120 and the upper cap portion 122. While the depicted lower cap portion 120 is permanently fixed with the upper cap portion 122 through a catch mechanism 140, the lower cap portion 120 may be additionally and/or alternatively fixed to the upper cap portion 122 through adhesive, welding, or fasteners without departing from the scope of the present disclosure.

A valve 152 that is a shut-off gear supported on the housing 116 in the interior of the cap 104 from the upper cap portion 122 is configured to close the opening 124 in the lower cap portion 120. The valve 152 includes a valve seat 154 configured to engage a lower cap portion seat 160 disposed around the opening 124 in the lower cap portion 120. The valve seat 154 and the lower cap portion seat 160 are complementary with each other such that when the valve seat 154 engages the lower cap portion seat 160, the valve seat 154 and the lower cap portion seat 160 close the opening 124 and form a seal which stops the fluid flow 112 from reaching the interior of the cap 104 from the interior of the filter body 102. In this manner, the valve 152 is configured to close the interior of the cap 104 from receiving the fluid flow 112 at the opening 124.

Figure 3:
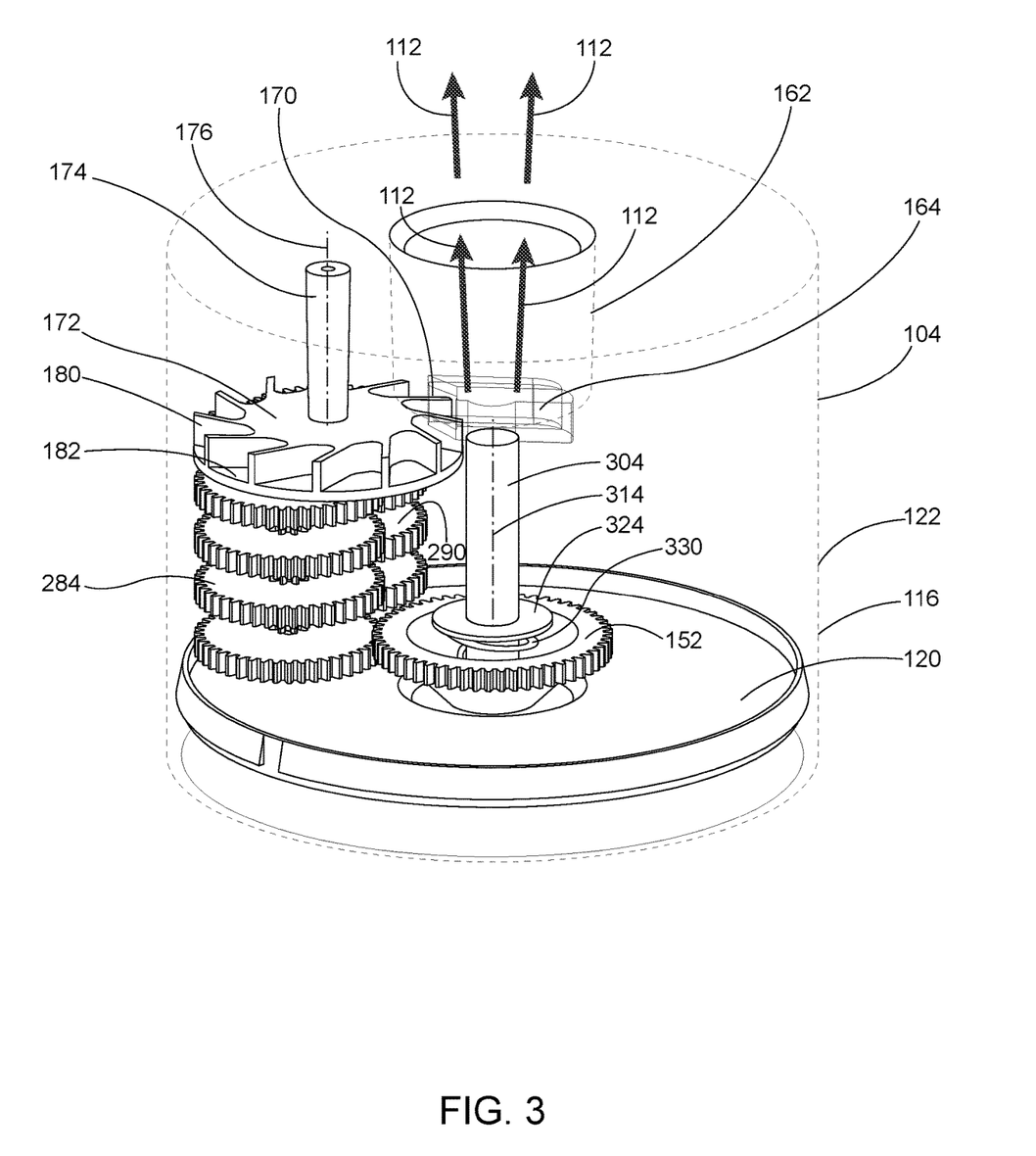
FIG. 3 is a partial perspective view of the cap.

As shown in FIG. 3, when the fluid flow 112 enters the interior of the cap 104, fluid in the fluid flow 112 fills the interior of the cap 104, and the fluid flow 112 is further directed through an outlet 162 defined in the upper cap portion 122, where the fluid flow 112 exits the interior of the cap 104. A channel 164 formed in the upper cap portion 122 at the outlet 162 defines a vent 170 configured for receiving the fluid flow 112 directed to the outlet 162, and a turbine 172 supported at the vent 170 is configured for being driven by the fluid flow 112 as the fluid flow 112 is received in the vent 170 from the interior of the cap 104. The channel 164 is configured to direct the fluid flow 112 in the interior of the cap 104 from the turbine 172 to the outlet 162.

The turbine 172 is supported on the housing 116, in the interior of the cap 104 at the vent 170 by a first rod 174 mounted on the lower cap portion 120 and the upper cap portion 122. When the turbine 172 is driven by the fluid flow 112, the turbine 172 rotates in a circumferential direction of the turbine 172, around a longitudinal axis 176 of the first rod 174 that defines a longitudinal direction of the first rod 174, while the first rod 174 remains stationary with respect to the lower cap portion 120 and the upper cap portion 122.

Figure 4:
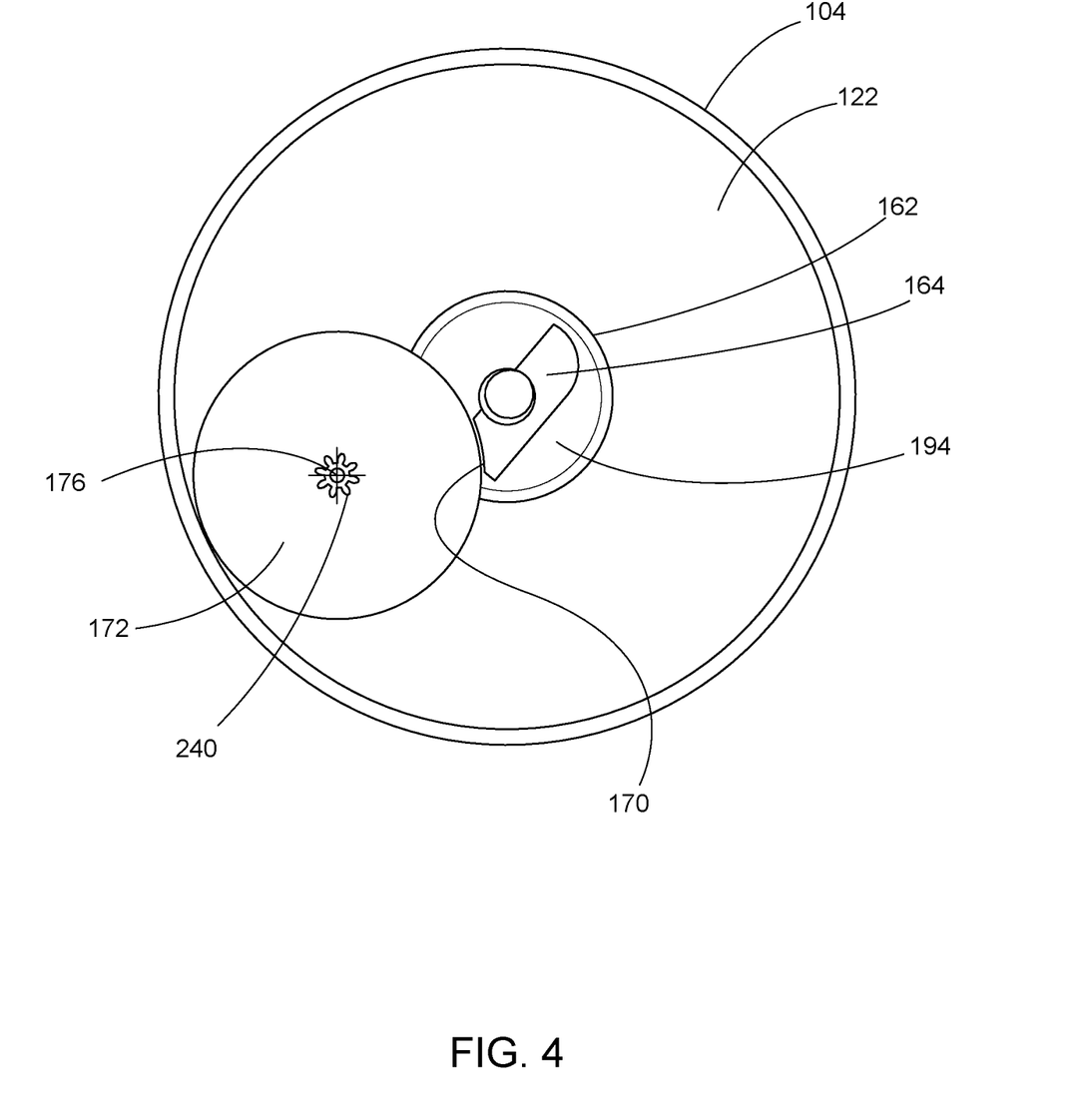
FIG. 4 is a partial bottom view of the cap.
Figure 5:
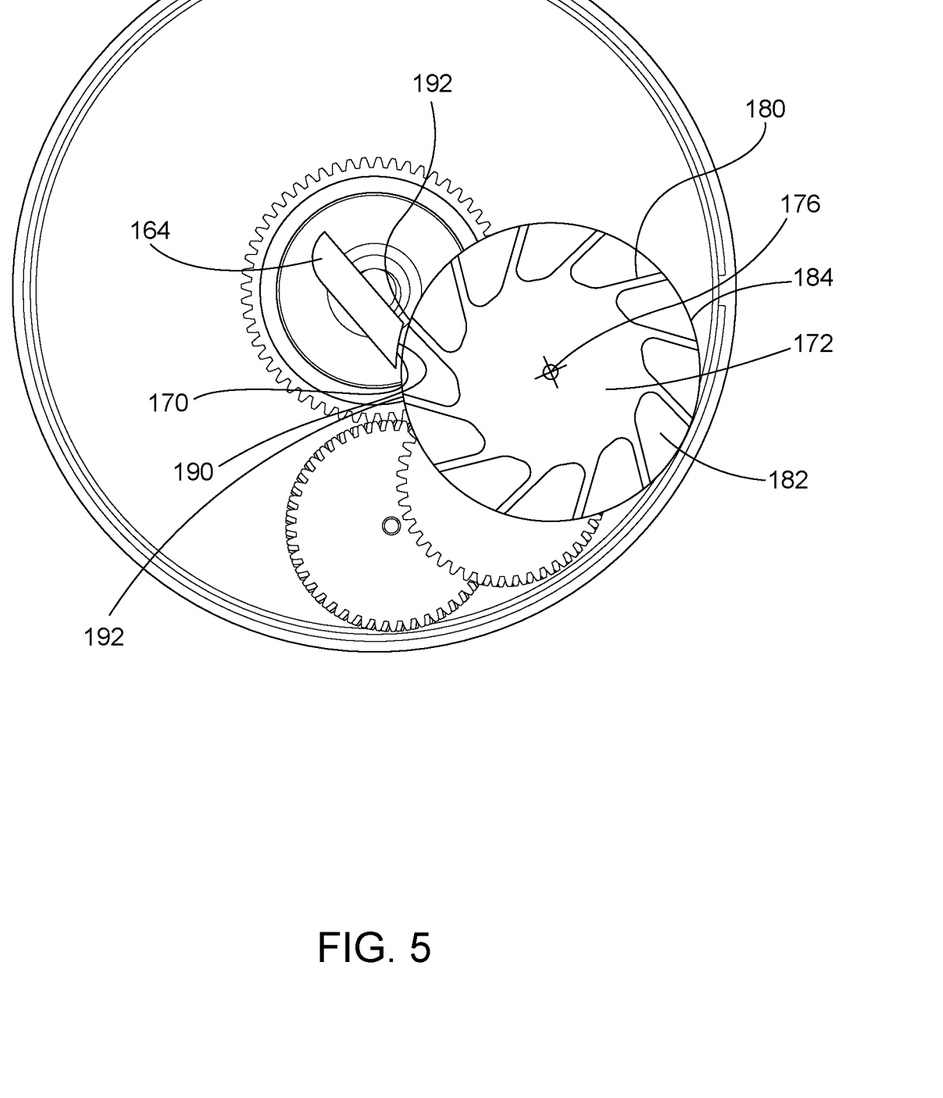
FIG. 5 is a partial top view of the cap.

The turbine 172 includes a plurality of blades 180 and a turbine wall 182 arranged at the vent 170 and extended in a radial direction of the turbine 172 that is perpendicular to the longitudinal axis 176 of the first rod 174. FIG. 4 depicts a partial bottom view of the cap 104 including the upper cap portion 122 and the turbine 172, FIG. 5 depicts a partial top view of the cap 104 including the channel 164 and the turbine 172 over the lower cap portion 120. As shown in FIGS. 4 and 5, the turbine 172 has a circular profile when viewed along the longitudinal axis 176 of the first rod 174.

With reference to FIG. 5, the plurality of blades 180 and the turbine wall 182 define an outer perimeter 184 of the turbine 172 with respect to the radial direction of the turbine 172, and the channel 164 includes a curved surface 190 at the vent 170, where a radius of curvature in the curved surface 190 matches a radius of the turbine 172. Also, the plurality of blades 180 are arranged in the circumferential direction of the turbine 172 and inclined along the radial direction of the turbine 172 such that a distance between ends 192 of consecutive blades in the plurality of blades 180 located along the outer perimeter 184 of the turbine 172 is larger than and complementary to a width of the vent 170 in the channel 164 along the circumferential direction of the turbine 172 for driving the turbine 172 with the fluid flow 112 at the vent 170 in the channel 164.

As shown in FIG. 4, the channel 164 extends from a bottom surface 194 of the outlet 162, and the turbine 172 is supported at the vent 170 in the channel 164 such that, as shown in FIG. 5, the turbine 172 encloses the vent 170 of the channel 164 between the ends 192 of consecutive blades in the plurality of blades 180 along the circumferential direction of the turbine 172, and such that the turbine 172 encloses the vent 170 of the channel 164 between the turbine wall 182 and the bottom surface 194 of the outlet 162 along the longitudinal direction of the first rod 174. With the turbine 172 enclosed over the vent 170 in the channel, the fluid flow 112 directed into the vent 170 of the channel 164 drives the turbine 172, rotating the turbine 172 in the circumferential direction of the turbine 172 according to a direction of the incline in the blades 180 along the radial direction of the turbine 172.

Figure 6:
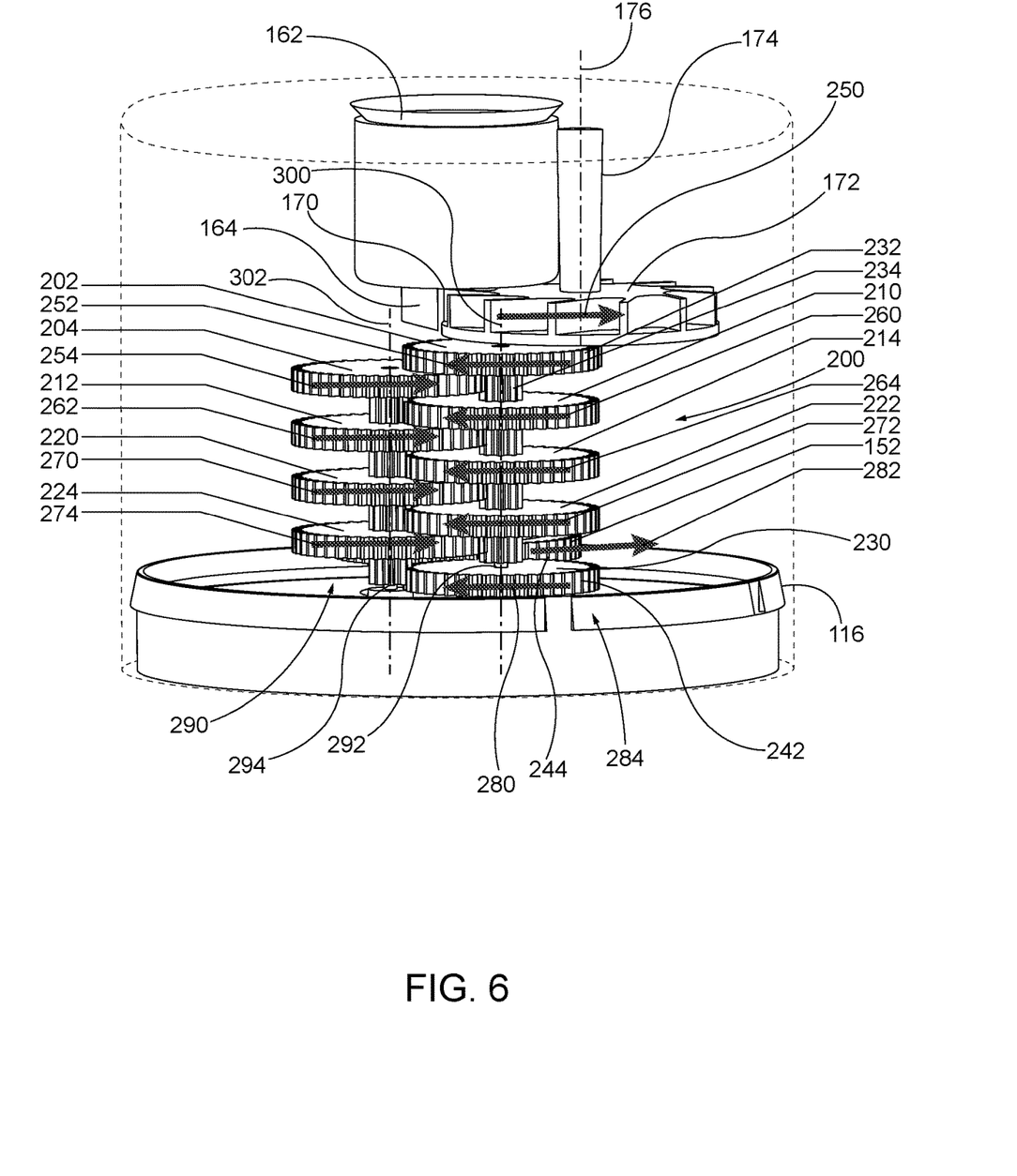
FIG. 6 is a partial perspective side view of the filter system.

FIG. 6 depicts a partial perspective side view of the filter system 100 including the turbine 172, a gear stack 200, and the valve 152 being driven by the fluid flow 112 from the turbine 172 at the vent 170 of the channel 164. As depicted, the gear stack 200 is a plurality of gears supported on the housing 116 in the interior of the cap 104 and includes a first gear 202 meshed with the turbine 172, a second gear 204 meshed with the first gear 202, a third gear 210 meshed with the second gear 204, a fourth gear 212 meshed with the third gear 210, a fifth gear 214 meshed with the fourth gear 212, a sixth gear 220 meshed with the fifth gear 214, a seventh gear 222 meshed with the sixth gear 220, an eighth gear 224 meshed with the seventh gear 222, and a ninth gear 230 meshed with each of the eighth gear 224 and the valve 152. With this construction, the first gear 202 is configured to successively drive each following gear in the gear stack 200 and the valve 152 in accordance with the meshed relationships of the gear stack 200 and the valve 152.

Each gear in the gear stack 200, except the ninth gear 230 as the last gear in the gear stack 200 from the turbine 172, is a double gear having a first set of teeth 232 paired with a second set of teeth 234, where the first set of teeth 232 and the paired second set of teeth 234 are respectively arranged in a pitch circle on a radially outer perimeter of the respective gear, along a circumferential direction of the gear. The pitch circle of the first set of teeth 232 has a diameter that is relatively large as compared to the pitch circle of the paired second set of teeth 234 such that when the corresponding gear in the gear stack 200 rotates in the circumferential direction, the first set of teeth 232 has a circumferential velocity faster than a circumferential velocity of the paired second set of teeth 234 by a predetermined ratio. As such, when a circumferential velocity is input to the first set of teeth 232, the paired second set of teeth 234 outputs a circumferential velocity reduced in accordance with the predetermined ratio, the predetermined ratio being determined according to a ratio in relative size between the pitch circles about which the first set of teeth 232 and the paired second set of teeth 234 are respectively arranged. In this manner, each gear in the gear stack 200 respectively featuring the first set of teeth 232 and the second set of teeth 234 is a reduction gear configured to reduce a circumferential velocity input to the first set of teeth 232 and output from the second set of teeth 234 according to the predetermined ratio.

Gears in the gear stack 200 featuring the first set of teeth 232 and the second set of teeth 234 are successively meshed with each other to form successive pairs of leading gears and following gears in the gear stack 200 from the turbine 172 to the valve 152, where the first set of teeth 232 of the following gear is meshed with the second set of teeth 234 of the leading gear. As depicted in FIG. 6, the first set of teeth 232 of the second gear 204 is meshed with the second set of teeth 234 of the first gear 202, the first set of teeth 232 of the third gear 210 is meshed with the second set of teeth 234 of the second gear 204, the first set of teeth 232 of the fourth gear 212 is meshed with the second set of teeth 234 of the third gear 210, the first set of teeth 232 of the fifth gear 214 is meshed with the second set of teeth 234 of the fourth gear 212, the first set of teeth 232 of the sixth gear 220 is meshed with the second set of teeth 234 of the fifth gear 214, the first set of teeth 232 of the seventh gear 222 is meshed with the second set of teeth 234 of the sixth gear 220, and the first set of teeth 232 of the eighth gear 224 is meshed with the second set of teeth 234 of the seventh gear 222. In this manner, the first gear 202 is configured to successively drive the second gear 204, the third gear 210, the fourth gear 212, the fifth gear 214, the sixth gear 220, the seventh gear 222, and the eighth gear 224 between meshed pairs of the first set of teeth 232 and the second set of teeth 234 when a circumferential velocity is input to the first set of teeth 232 of the first gear 202, rotating the first gear 202 in a circumferential direction of the first gear 202.

The turbine 172 incudes a third set of teeth 240 (FIG. 4) extended from a side of the turbine wall 182 opposite from the plurality of blades 180, arranged in a pitch circle with respect to the turbine 172, and fixed with the turbine 172 such that the third set of teeth 240 are configured to rotate with the turbine 172 when the turbine 172 is driven by the fluid flow 112. The first set of teeth 232 of the first gear 202 is meshed with the third set of teeth 240 of the turbine 172 such that when the fluid flow 112 drives the blades 180 of the turbine 172 at the vent 170 in the channel 164, the third set of teeth 240 of the turbine 172 drives the first gear 202 at the first set of teeth 232 of the first gear 202, where a rotational speed of the blades 180 translates to the third set of teeth 240, and the third set of teeth 240 inputs a corresponding circumferential velocity to the first set of teeth 232 of the first gear 202.

With continued reference to FIG. 6, the ninth gear 230 includes a fourth set of teeth 242 disposed around a radially outer perimeter of the ninth gear 230 and arranged in a pitch circle with respect to the ninth gear 230, and the valve 152 includes a fifth set of teeth 244 disposed about a radially outer perimeter of the valve 152 and arranged in a pitch circle with respect to the valve 152, where the fourth set of teeth 242 are meshed with the second set of teeth 234 of the eighth gear 224, and the fourth set of teeth 242 are meshed with the fifth set of teeth 244. With this construction, when the blades 180 of the turbine 172 are driven by the fluid flow 112 to rotate around the longitudinal axis 176 of the first rod 174, a rotational speed of the turbine 172 corresponding to a circumferential velocity of the plurality of blades 180 is translated to the third set of teeth 240, and a circumferential velocity of the third set of teeth 240 corresponding to the rotational speed of the turbine 172 is input to the first set of teeth 232 of the first gear 202.

Further, a rotational speed of the first gear 202 corresponding to the circumferential velocity input to the first set of teeth 232 of the first gear 202 is translated to the second set of teeth 234 of the first gear 202, and a corresponding circumferential velocity of the second set of teeth 234 of the first gear 202 is input to the first set of teeth 232 of the second gear 204, driving the second gear 204. In a manner similar to the first gear 202 driving the second gear 204, the second gear 204 drives the third gear 210 where a rotational speed of the second gear 204 corresponding to the circumferential velocity input to the first set of teeth 232 of the second gear 204 is translated to the second set of teeth 234 of the second gear 204 and a corresponding circumferential velocity of the second set of teeth 234 of the second gear 204 is input to the first set of teeth 232 of the third gear 210.

In a manner similar to the first gear 202 driving the second gear 204, and the second gear 204 driving the third gear 210, the rotational speed of the turbine 172 driven by the plurality of blades 180 is directed through successive pairs of gears in the gear stack 200. Because each first set of teeth 232 and each paired second set of teeth 234 are respectively arranged in a pitch circle on a gear in the gear stack 200 such that a circumferential velocity input to the first set of teeth 232 is reduced as output from the paired second set of teeth 234 by a predetermined ratio, each successive pair of gears in the gear stack 200 is configured to reduce the circumferential velocity and the rotational speed of the first gear 202 by a predetermined ratio when the turbine 172 is driven by the fluid flow 112.

As shown in FIG. 6, the turbine 172 is driven by the fluid flow 112 to rotate around the longitudinal axis 176 of the first rod 174 in a direction indicated by a first arrow 250, which is counterclockwise with respect to a view taken downward from the upper cap portion 122 toward the lower cap portion 120, such as the top view of the cap 104 depicted in FIG. 5. With continued reference to FIG. 6, in accordance with the meshed relationships between the turbine 172, the gear stack 200, and the valve 152, the turbine 172 rotating in the direction of the first arrow 250 successively causes each gear in the gear stack 200 to respectively rotate in alternating clockwise and counterclockwise directions with respect to a view taken from the upper cap portion 122 toward the lower cap portion 120, as indicated by a second arrow 252 at the first gear 202, a third arrow 254 at the second gear 204, a fourth arrow 260 at the third gear 210, a fifth arrow 262 at the fourth gear 212, a sixth arrow 264 at the fifth gear 214, a seventh arrow 270 at the sixth gear 220, an eighth arrow 272 at the seventh gear 222, a ninth arrow 274 at the eighth gear 224, and a tenth arrow 280 at the ninth gear 230. Because the ninth gear 230 is meshed with the valve 152, the ninth gear 230 rotating in the clockwise direction indicated by the tenth arrow 280 causes the valve 152 to rotate in a counterclockwise direction with respect to a view taken from the upper cap portion 122 toward the lower cap portion 120, as indicated by an eleventh arrow 282.

The gear stack 200 is arranged in a first column 284 and a second column 290 respectively supported on the housing 116 in the interior of the cap 104 by a second rod 292 and a third rod 294. As shown in FIG. 6, the first column 284 includes the first gear 202, the third gear 210, the fifth gear 214, the seventh gear 222, and the ninth gear 230, which are supported by the second rod 292, along a longitudinal axis 300 of the second rod 292 that defines a longitudinal direction of the second rod 292 parallel with the longitudinal direction of the first rod 174. Each gear in the second column 290 is respectively configured to rotate in the circumferential direction of the corresponding gear, around the longitudinal axis 300 of the second rod 292 while the second rod 292 remains stationary with respect to the lower cap portion 120 and the upper cap portion 122.

The second column 290 includes the second gear 204, the fourth gear 212, the sixth gear 220, and the eighth gear 224, which are supported by the third rod 294, along a longitudinal axis 302 of the third rod 294 that defines a longitudinal direction of the third rod 294 parallel with the longitudinal direction of the second rod 292. Each gear in the second column 290 is respectively configured to rotate in the circumferential direction of the corresponding gear, around the longitudinal axis 302 of the third rod 294 while the third rod 294 remains stationary with respect to the lower cap portion 120 and the upper cap portion 122.

The gears in the first column 284 and the gears in the second column 290 are successively meshed with each other such that the gear stack 200 forms a constant mesh gearbox that mechanically connects the turbine 172 to the valve 152 across the interior of the cap 104 between the lower cap portion 120 and the upper cap portion 122, and has a predetermined gear ratio between the turbine 172 and the valve 152. The predetermined gear ratio in the gear stack 200 is determined by the predetermined ratio between each first set of teeth 232 and each paired second set of teeth 234 in the gear stack 200, and a total number of gears in the gear stack 200 connecting the turbine 172 to the valve 152. While the depicted gear stack 200 includes nine gears, the gear stack 200 is at least one gear and may include more or fewer gears that have similar features and function in a similar manner as the gears in the depicted gear stack 200 without departing from the scope of the present disclosure. While the gears in the depicted gear stack 200 each have the same predetermined ratio between the first set of teeth 232 and the paired second set of teeth 234, each gear in the gear stack 200 may respectively feature a unique predetermined ratio between the first set of teeth 232 and the second set of teeth 234 without departing from the scope of the present disclosure.

Figure 7:
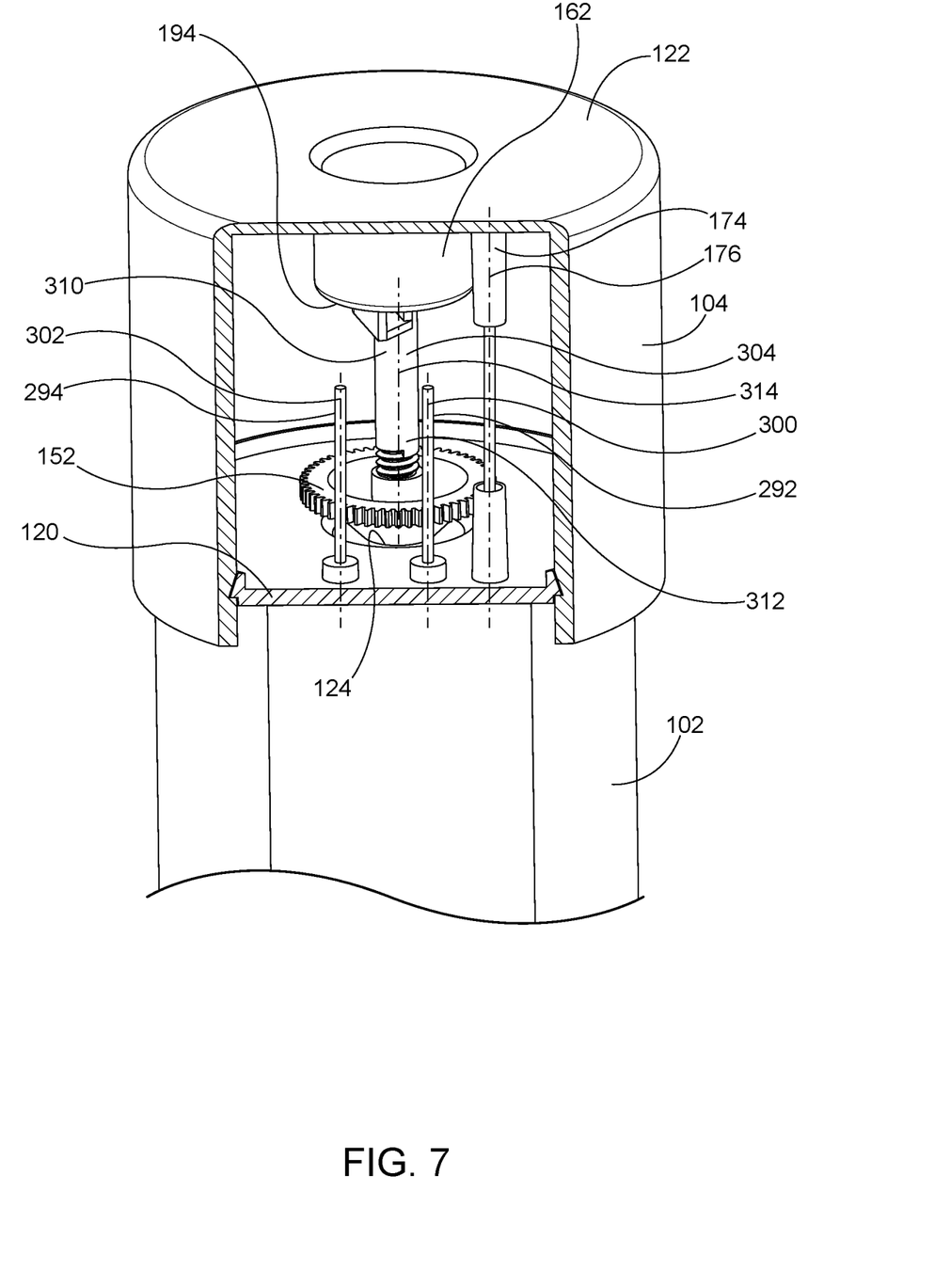
FIG. 7 is a partial, cross-sectional perspective view of the filter system.

FIG. 7 depicts a partial, cross-sectional perspective view of the filter system 100 including the second rod 292 and the third rod 294 in the interior of the cap 104. As shown in FIG. 7, the second rod 292 is mounted on the lower cap portion 120 in the interior of the cap 104 and extends toward the upper cap portion 122 such that the longitudinal axis 300 of the second rod 292 is parallel with the longitudinal axis 176 of the first rod 174.

The third rod 294 includes similar features, and functions in a similar manner as the second rod 292. In this manner, the third rod 294 is mounted on the lower cap portion 120 in the interior of the cap 104 and extends toward the upper cap portion 122 such that the longitudinal axis 302 of the third rod 294 is parallel with the longitudinal axis 300 of the second rod 292, and parallel with the longitudinal axis 176 of the first rod 174.

A shaft 304 disposed in the interior of the cap 104 includes a proximal end portion 310 mounted to the upper cap portion 122 at the bottom surface 194 of the outlet 162, and a distal end portion 312 extended from the proximal end portion 310 toward the opening 124 in the lower cap portion 120 along a longitudinal axis 314 of the shaft 304 that is parallel with the longitudinal axis 300 of the second rod 292 and defines a longitudinal direction of the shaft 304. The proximal end portion 310 of the shaft 304 is located on the upper cap portion 122 such that the distal end portion 312 of the shaft 304 is aligned with the opening 124 in the lower cap portion 120 in the longitudinal direction of the shaft 304.

The valve 152 is supported on the housing 116 in the interior of the cap 104 on the distal end portion 312 of the shaft 304 such that the valve 152 is aligned with the opening 124 in the lower cap portion 120 in the longitudinal direction of the shaft 304. As shown in FIG. 2, the distal end portion 312 of the shaft 304 includes a threaded section 320, and the valve 152 includes threads 322 configured to engage the threaded section 320 such that rotating the valve 152 in a circumferential direction of the valve 152, around the longitudinal axis 314 of the shaft 304, causes the threaded section 320 to translate the valve 152 along the shaft 304 in the longitudinal direction of the shaft 304. When the fluid flow 112 drives the valve 152 through the turbine 172 and the gear stack 200, the valve 152 translates along the shaft 304 toward the opening 124 in the lower cap portion 120 until the valve seat engages the lower cap portion seat 160.

A washer 324 fixed with the distal end portion 312 of the shaft 304 is threaded onto the shaft 304, and a spring 330 disposed around the shaft 304 is interposed between and separates the washer 324 and the valve 152 along the shaft 304 with respect to the longitudinal direction of the shaft 304. The spring 330 is a compression spring configured to exert a constant spring force on the valve 152 from the washer 324, toward the opening 124 in the lower cap portion 120.

A thickness or a position of the washer 324 along the shaft 304, in the longitudinal direction of the shaft 304, may be adjusted to change an initial position of the valve 152 on the shaft 304 when the valve 152 is assembled with the washer 324 and the spring 330 on the shaft 304, and the fluid flow 112 has not driven the valve 152 through the turbine 172 and the gear stack 200. In this manner, the thickness or the position of the washer 324 along the shaft 304 may be adjusted to change a number of rotations around the longitudinal axis 314 of the shaft 304 made by the valve 152 before the valve seat 154 engages the lower cap portion seat 160 and stops the fluid flow 112 from reaching the interior of the cap 104.

Figure 8:
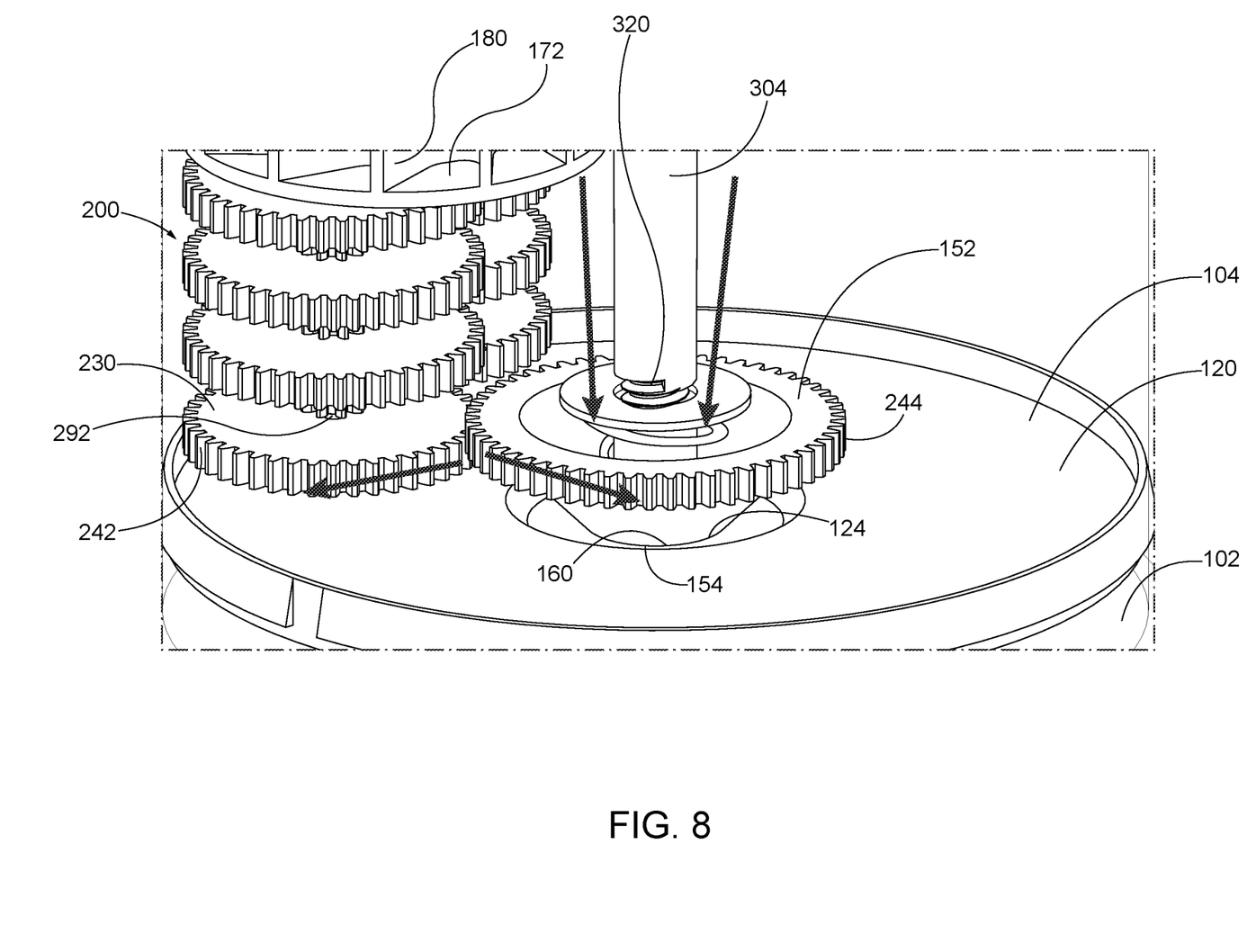
FIG. 8 is an enlarged partial perspective view of the cap.

As shown in FIG. 8, the threaded section 320 is formed from left hand threads such that when the valve 152 is caused to rotate in the counterclockwise direction, the valve 152 translates along the shaft 304 in the longitudinal direction of the shaft 304 toward the opening 124 in the lower cap portion 120. The valve 152 is configured to translate along the shaft 304 until the valve seat 154 engages the lower cap portion seat 160, closing the opening 124 in the lower cap portion 120 to form a seal which stops the fluid flow 112 from reaching the interior of the cap 104 from the interior of the filter body 102. The fourth set of teeth 242 on the ninth gear 230 extend in the longitudinal direction of the second rod 292, and the fifth set of teeth 244 on the valve 152 extend in the longitudinal direction of the shaft 304 such that the fourth set of teeth 242 and the fifth set of teeth 244 remain engaged with each other as the valve 152 translates along the shaft 304 and closes the opening 124 in the lower cap portion 120. While the depicted threaded section 320 is formed from left hand threads, the threaded section may be formed from either left hand or right hand threads so as to translate the valve 152 along the shaft 304 toward the opening 124 in the lower cap portion 120 when the fluid flow 112 drives the valve 152 through the turbine 172 and the gear stack 200.

An amount of rotation of the turbine 172 around the longitudinal axis 176 of the first rod 174 driven by the fluid flow 112 corresponds with an amount of fluid in the fluid flow 112 that has passed through the outlet 162 at the vent 170 in the channel 164. In this manner, the amount of rotation of the turbine 172 driven by the fluid flow 112 can be used to measure the amount of fluid in the fluid flow 112 that has passed through the vent 170 in the channel 164. With the fluid flow 112 directed from the exterior of the filter body 102 to the vent 170 in the channel 164, the amount of rotation of the turbine 172 driven by the fluid flow 112 can be used to measure the amount of fluid in the fluid flow 112 that has passed through the filter body 102.

The gear stack 200 forms a constant mesh gearbox that mechanically connects the turbine 172 to the valve 152 and has a predetermined gear ratio between the turbine 172 and the valve 152 such that the rotation of the turbine 172 driven by the fluid flow 112 causes a relatively reduced amount of rotation of the valve 152 according to the predetermined gear ratio, translating the valve 152 along the shaft 304 toward the opening 124 in the lower cap portion 120. In this manner, the valve 152 is configured to close the opening 124 of the lower cap portion 120 and stop the fluid flow 112 from entering the interior of the cap 104 after a predetermined amount of rotation by the turbine 172, which corresponds with an amount of fluid in the fluid flow 112 that has passed through the filter body 102. With this construction, the cap 104 is a shutoff cap configured to stop the fluid flow 112 through the filter body 102 after a predetermined amount of rotation by the turbine 172 corresponding with an amount of the fluid flow 112 that has passed through the filter body 102.

In an alternative embodiment, the turbine 172 is driven by the fluid flow 112 at the opening 124 in the lower cap portion 120 as the inlet to the interior of the cap 104, where the valve 152 is configured to translate along the shaft 304 toward the upper cap portion 122 to close the outlet 162, and the structure disposed within the interior of the cap 104 has an inverse orientation in the longitudinal direction of the shaft 304 as compared to the structure depicted in FIGS. 1-8. In this embodiment, a fluid pressure in the interior of the cap 104 presses the valve 152 against the outlet 162 when the valve 152 closes the outlet 162. In a further alternative embodiment, after driving the turbine 172 at the lower cap portion 120, the fluid flow 112 is directed toward the upper cap portion 122 through a closed system, leaving areas of the interior of the cap not contacted by the fluid flow 112. In the closed system, a direct laminar or near laminar flow can be maintained in the fluid flow 112 through the interior of the cap 104, increasing a reliability in the turbine 172 being driven by the fluid flow 112 and allowing for more control over the flow of water within the cap 104.

As shown in FIG. 3, the turbine 172, the gears in the gear stack 200, and the valve 152 are respectively arranged with a horizontal orientation in the interior of the cap 104, between the lower cap portion 120 and the upper cap portion 122, perpendicular to the longitudinal direction of the shaft 304. Also, the first column 284 and the second column 290 of the gear stack 200 are directed along the longitudinal direction of the shaft 304, in parallel with the longitudinal axis 314 of the shaft 304, from the turbine 172 to the valve 152 across the interior of the cap 104. While the depicted turbine 172 is a horizontal turbine that has a horizontal orientation at the vent 170 of the channel 164, in another alternative embodiment, the turbine 172 is an axial turbine arranged directly at the opening 124 of the lower cap portion 120. In this embodiment, the fluid flow 112 is directed upward toward the upper cap portion 122 from the opening 124 in the lower cap portion 120 to drive the turbine 172, reducing an amount of friction in the fluid flow 112 through the interior of the cap 104. Also, while gears in the depicted gear stack 200 are enmeshed vertically, in another alternative embodiment gears in the gear stack 200 are enmeshed horizontally, reducing an overall height of the gear stack 200 in the interior of the cap 104 between the lower cap portion 120 and the upper cap portion 122, and reducing an overall height of the cap 104 necessary for housing the gear stack 200 in the interior of the cap 104.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A cap for a filter system, the cap comprising:
   a housing that defines an interior of the cap configured for receiving a fluid flow;
   a turbine supported on the housing in the interior of the cap and configured for being driven by the fluid flow;
   at least one gear supported on the housing and meshed with the turbine for being driven by the turbine; and
   a valve supported on the housing and meshed with the at least one gear for being driven by the at least one gear,
   wherein the valve closes the interior of the cap from receiving the fluid flow after a predetermined number of rotations driven by the at least one gear.

2. The cap according to claim 1, further comprising:
   a shaft having a proximal end portion mounted on the housing, and a distal end portion extended from the proximal end portion in a longitudinal direction of the shaft,
   wherein the valve is supported in the interior of the cap on the distal end portion of the shaft, the housing defines an opening to the interior of the cap, and the proximal end portion of the shaft is located on the housing such that the distal end portion of the shaft and the valve are aligned with the opening in the longitudinal direction of the shaft.

3. The cap according to claim 2, further comprising:
   a washer fixed with the distal end portion of the shaft; and
   a spring disposed around the shaft, interposed between and separating the washer and the valve along the shaft, and configured to exert a constant spring force on the valve from the washer toward the opening, including when the valve closes the interior of the cap from receiving the fluid flow.

4. The cap according to claim 2, wherein the distal end portion of the shaft includes a threaded section, and the valve includes threads configured to engage the threaded section such that driving the valve the predetermined number of rotations around the shaft causes the threaded section to translate the valve along the shaft from an initial position on the shaft to the opening, closing the interior of the cap from receiving the fluid flow.

5. The cap according to claim 2, wherein the turbine, the at least one gear, and the valve are respectively arranged with an orientation perpendicular to the longitudinal direction of the shaft.

6. The cap according to claim 1, wherein the housing defines a vent configured for receiving the fluid flow, and the turbine is supported in the interior of the cap at the vent such that the fluid flow at the vent drives the turbine.

7. The cap according to claim 6, further comprising:
a shaft having a proximal end portion mounted on the housing, and a distal end portion extended from the proximal end portion in a longitudinal direction of the shaft;
an opening defined in the housing as an inlet for the fluid flow to the interior of the cap; and
a vent defined in the housing at an outlet where the fluid flow exits the interior of the cap;
wherein the valve is supported in the interior of the cap on the distal end portion of the shaft, and the proximal end portion of the shaft is located on the housing such that the distal end portion of the shaft and the valve are aligned with the opening in the longitudinal direction of the shaft, and
wherein the turbine is supported in the interior of the cap at the vent such that the fluid flow at the vent drives the turbine.

8. The cap according to claim 1, wherein the at least one gear is a plurality of gears included in a gear stack that mechanically connects the turbine to the valve across the interior of the cap and has a predetermined gear ratio between the turbine and the valve such that an amount of rotation of the turbine driven by the fluid flow causes a relatively reduced amount of rotation of the valve according to the predetermined gear ratio.

9. The cap according to claim 8, wherein the gear stack is arranged in a first column and a second column, and the gears in the first column and the gears in the second column are successively meshed with each other such that the gear stack forms a constant mesh gearbox that mechanically connects the turbine to the valve.

10. The cap according to claim 8, wherein the gear stack includes double gears that respectively have a first set of teeth and a second set of teeth,
wherein each first set of teeth and each second set of teeth are respectively arranged in a pitch circle on a corresponding gear, along a circumferential direction of the gear, and the pitch circle of the first set of teeth has a diameter that is relatively large as compared to the pitch circle of the second set of teeth such that when a circumferential velocity with respect to the gear is input to the first set of teeth, the second set of teeth outputs a circumferential velocity that is reduced according to a ratio in relative size between the pitch circles about which the first set of teeth and the second set of teeth are respectively arranged, and
wherein gears featuring the first set of teeth and the second set of teeth are successively meshed with each other to form successive pairs of leading gears and following gears in the gear stack from the turbine to the valve, wherein the first set of teeth of the following gear is meshed with the second set of teeth of the leading gear.

11. The cap according to claim 1, wherein the housing defines an opening to the interior of the cap, and a filter body is fixed directly to the cap at the opening such that the interior of the cap and an interior of the filter body are in direct fluid communication through the opening.

12. The cap according to claim 1, further comprising:
a lower cap portion and an upper cap portion forming the housing, the lower cap portion being fixed with the upper cap portion to define the interior of the cap enclosed between the lower cap portion and the upper cap portion,
wherein the lower cap portion defines an opening to the interior of the cap, and the valve is supported in the interior of the cap from the upper cap portion.

13. A cap for a filter system, the cap comprising:
a housing that defines an interior of the cap and an opening configured for receiving a fluid flow into the interior of the cap;
a shaft having a proximal end portion mounted on the housing, and a distal end portion extended from the proximal end portion in a longitudinal direction of the shaft;
a valve supported in the interior of the cap on the distal end portion of the shaft, the proximal end portion of the shaft being located on the housing such that the distal end portion of the shaft and the valve are aligned with the opening in the longitudinal direction of the shaft;
a turbine supported on the housing in the interior of the cap and configured for being driven by the fluid flow; and
a gear stack supported on the housing, and meshed with the turbine and the valve such that when the fluid flow drives the turbine, the turbine drives the valve through the gear stack to rotate around the shaft,
wherein the valve closes the interior of the cap from receiving the fluid flow after a predetermined number of rotations around the shaft driven by the gear stack.

14. The cap according to claim 13, wherein the gear stack is arranged in a column along the longitudinal direction of the shaft from the turbine to the valve.

15. The cap according to claim 13, wherein the shaft includes a threaded section at the distal end portion of the shaft, and the valve includes threads configured to engage the threaded section such that when the fluid flow drives the valve through the turbine and the gear stack, the valve translates along the shaft, in the longitudinal direction of the shaft, toward the opening until the valve closes the interior of the cap from receiving the fluid flow at the opening.

16. The cap according to claim 15, further comprising:
a washer threaded onto the distal end portion of the shaft; and
a spring disposed around the shaft, interposed between and separating the washer and the valve along the shaft, and configured to exert a constant spring force on the valve from the washer toward the opening, including when the valve closes the interior of the cap from receiving the fluid flow.

17. The cap according to claim 13, further comprising a vent defined in the housing and configured for receiving the fluid flow,
wherein the turbine is supported in the interior of the cap at the vent such that the fluid flow at the vent drives the turbine.

18. The cap according to claim 17, wherein the vent is located at an outlet defined by the housing, where the fluid flow exits the interior of the cap.

19. The cap according to claim 17, further comprising a channel formed in the housing to direct fluid flow in the interior of the cap, wherein the channel defines the vent.

20. The cap according to claim 13, wherein the gear stack forms a constant mesh gearbox that mechanically connects the turbine to the valve, and wherein the turbine, gears in the gear stack, and the valve are respectively arranged with an orientation perpendicular to the longitudinal direction of the shaft.

\* \* \* \* \*